United States Patent [19]

Newhouse et al.

[11] 4,255,977

[45] Mar. 17, 1981

[54] DOUBLE REPETITION RATE DOPPLER FLOW MEASUREMENT SYSTEM

[75] Inventors: Vernon L. Newhouse; Phung LeCong, both of West Lafayette, Ind.

[73] Assignee: Purdue Research Foundation, West Lafayette, Ind.

[21] Appl. No.: 955,588

[22] Filed: Oct. 30, 1978

[51] Int. Cl.³ ............................................. G01F 1/66
[52] U.S. Cl. ................................. 73/861.25; 128/663
[58] Field of Search ...................... 128/663; 73/861.25

[56] References Cited

U.S. PATENT DOCUMENTS 3,940,731  2/1976  Cooper et al. ................ 73/194 XA Primary Examiner—Charles A. Ruehl
Attorney, Agent, or Firm—John R. Nesbitt; Robert E. Harris

[57] ABSTRACT

A multiple repetition rate for pulsed Doppler systems is disclosed which permits Doppler frequency identification of flow rates, for example, blood flow, at deep interior points in a mass, such as a human subject.

4 Claims, 1 Drawing Figure

4,255,977

DOUBLE REPETITION RATE DOPPLER FLOW MEASUREMENT SYSTEM

GOVERNMENT RIGHTS

The Government has rights in this invention pursuant to Grant No. ENG73-08272 awarded by the National Science Foundation.

FIELD OF THE INVENTION

This invention relates to pulsed Doppler systems utilized for flow rate measurements, and particularly, to such systems used to measure blood flow rates at deep points in human subjects.

BACKGROUND OF THE INVENTION

The measurement of blood flow in superficial vessels of the body is usually performed with a continuous ultrasound Doppler system. For deep-lying vessels pulsed doppler must be used to resolve the range. However, pulsed Doppler systems are plagued by a range-velocity product maximum which makes it impossible for them to measure the fastest blood flows occurring deep in the heart. This invention describes a double repetition rate system which overcomes this handicap. Also described are several techniques for applying this principle to a practical clinical system.

Continuous Doppler Velocimeter

Ultrasound beams have been used to measure flow velocity. The velocity information is obtained through the demodulation of the Doppler-shifted ultrasound beam. The Doppler frequency, $f_d$, is related to the velocity, V, by the relation.

$$f_d = 2 \frac{V}{C} f_0 \qquad (1)$$

where $f_o$ is the ultrasound frequency and C is its propagation velocity.

In a majority of cases, particularly in bio-medical applications, measurement of the velocity of blood flow using ultrasound beams requires knowledge of the range of the flow. The continuous ultrasound velocimeter fails in this aspect. The reason is that, if there are several objects at different ranges, the reflector cannot tell which part of the echo is of interest.

Pulsed Doppler Velocimeter

In this type of system, the ranges of flow are resolved through the use of a pulsed ultrasound beam. In this approach, a pulse of ultrasound (from an ultrasound beam generator 9 coupled through a beam rate control (pulsed) 11) is sent out to the target 13 and the returning echo is mixed at receiver mixer 15 with a delayed reference signal from delay 19 controlled by delay control 17. This will allow the reference signal to correlate only with an echo whose round trip transmit time, (2R/C), is equal to the delay time, $\tau$, $$\tau = 2R/C$$

By varying the delay time $\tau$, flows at different ranges R can be mapped out. However, the echo from the target of interest can only be unambiguously selected out of the echoes from other targets if that echo arrives at the transducer before another pulse is transmitted, i.e., the time interval between pulses must be greater than $\tau$.

This requirement limits the highest pulse repetition frequency $f_r$:

$$[f_r]_{max} < (1/\tau) = (C/2R) \qquad (2)$$

One feature of the Pulsed Doppler Velocimeter (PDV) is that the demodulated output spectrum is no longer a narrow band spectrum around $f_d$, as in the continuous Doppler velocimeter, but instead, consists of a series of narrow band spectra centered at $$nf_r \pm f_{dn\pm} \simeq nf_r \pm f_d \qquad (3)$$
$$(n = 0, 1, 2, \ldots)$$

where $$f_{dn\pm} = 2 \frac{V}{C}(f_0 \pm nf_r) \simeq \frac{2V}{C} f_0 = f_d$$

for the limited values of n which pass through a practical system.

It can be seen that at high velocity or low repetition frequency $f_r$, $[(n-1)f_r + f_d]$ may be greater than $[nf_r - f_d]$, resulting in frequency aliasing (crossing over).

To avoid this problem, we must have, from the sampling theorem:

$$f_d + \tfrac{1}{2} \Delta f_d < \tfrac{1}{2} f_r \qquad (4)$$

where $\Delta f_d$ is the width of the Doppler spectrum.

Combining with (2) yields:

$$R(f_d + \tfrac{1}{2} \Delta f_d)_{max} < \frac{C}{4} \qquad (5)$$

This relation clearly limits the measurable range and Doppler frequency. Hence, the usefulness of the PDV is reduced, particularly in applications to oceanography and cardiology where the range-velocity product (5) is usually large.

DESCRIPTION OF THE INVENTION

Double-Repetition Rate Pulsed Doppler Velocimeter

Figure 1:
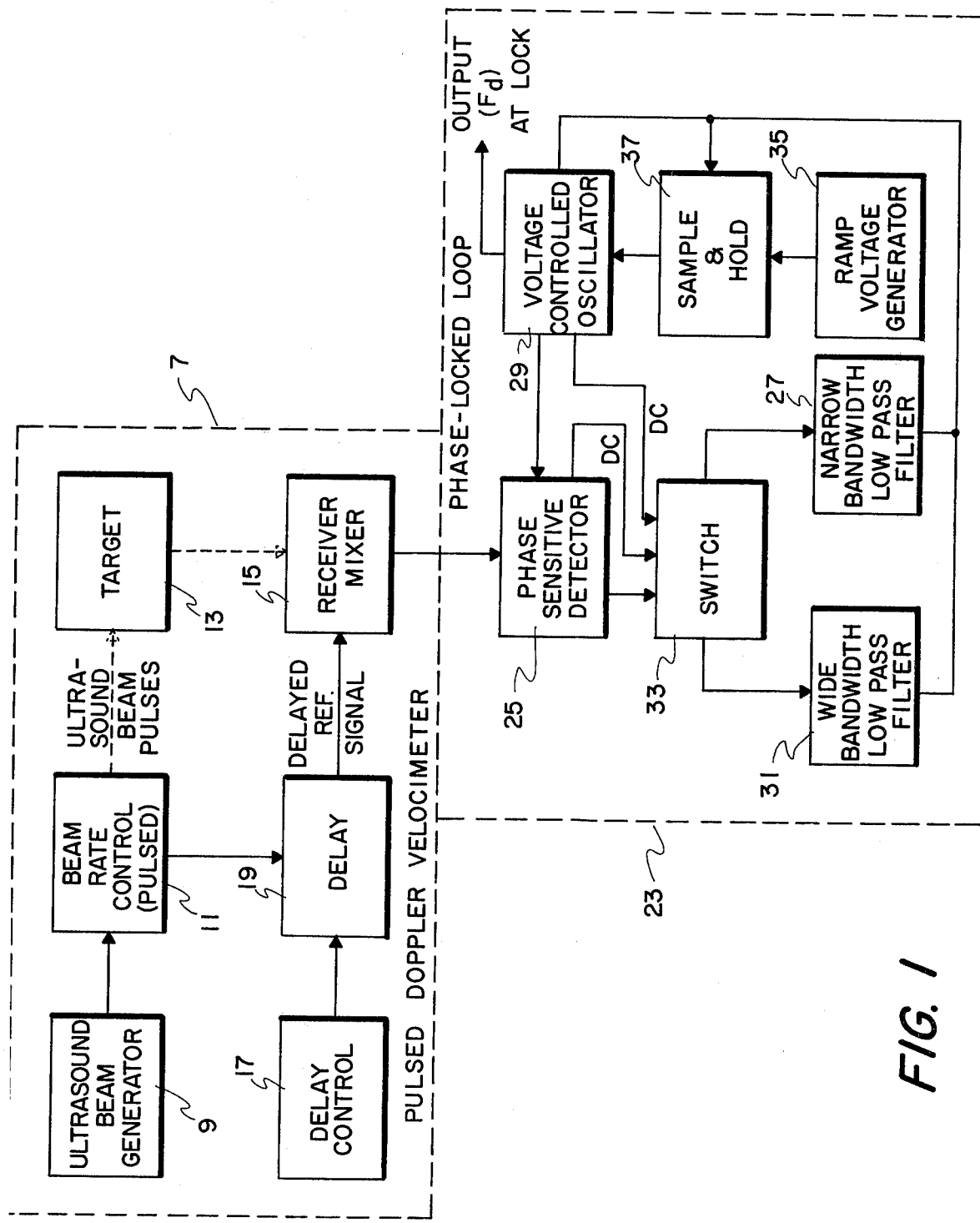
FIG. 1 is a block diagram illustrating the system of this invention.

The demodulated output spectrum of a PDV, as evidenced from (3), consists of groups of spectra.

| n = 0 |           | 0      | $f_d$         |
| ----- | --------- | ------ | ------------- |
| n = 1 | $f_r - f_d$ | $f_r$  | $f_r + f_d$   |
| n = 2 | $2f_r - f_d$ | $2f_r$ | $2f_r + f_d$  |

All these spectra contain the Doppler frequency $f_d$ as well as the repetition frequency, $f_r$, except the n=0 group which is independent of $f_r$. This suggests that (5) can be violated by operating the system at two different repetition rates $f_r$ and $f_r'$ successively. The alteration of $f_r$ and $f_r'$ will displace all spectra accordingly while the true Doppler spectrum, centered at $f_d$ will remain in the same position and therefore can be identified. One identification procedure consists of displaying on a spectrum analyzer successive spectra taken every few milliseconds corresponding to two repetition rates. Examination of this display shows the false spectra changing their center frequency abruptly with repetition rate, whereas the true spectrum shifts smoothly in accordance with the change of blood flow with time. One of the shortcomings of this procedure is that the response time of current spectrum analyzers is rather long (50 msec). Thus, any change in the measured velocity within this response time would displace these two spectra differently, making the comparison extremely difficult.

Phase-Locked Loop (PLL)

Another way to single out $f_d$ and even to track it is to use a PLL 23. A PLL consists of a phase-sensitive detector (PSD) 25, a low pass filter (LPF) 27, and a voltage controlled oscillator (VCO) 29. The PSD mixes the input signal of frequency $f_d$ with the VCO signal of frequency $f_{vco}$. At the PSD output, there are signals of frequencies $f_d + f_{vco}$ and $f_d - f_{vco}$. These signals are blocked by the LPF except when $f_d$ and $f_{vco}$ are close enough to be within the capture range of the loop. In this case, one of the PSD outputs is a slowly time-varying aperiodic signal which is passed through the LPF to drive the VCO frequency, $f_{vco}$, toward exact matching with $f_d$. Thus a phase-lock is achieved and $f_{vco}$ is a measure of $f_d$. The PSD output now contains a d-c component, due to a constant phase difference between its two input signals, which is fed to the VCO to maintain the lock. This d-c voltage, which is a true and direct indication of the phase-lock, will be used as a switching signal for operations described below. Any deviation from the matching condition will generate an aperiodic signal which will restore the lock. This property will enable the PLL to track the signal frequency.

Application of the PLL to the Double-Repetition Rate Pulsed Doppler Velocimeter Since the spectrum centered at $f_d$ is independent of repetition frequency $f_r$, if the PLL happens to lock at $f_d$, the lock will not be affected as the repetition rates are alternated. However, if the PLL locks at components given in (3) other than the true Doppler spectrum, this lock will be lost as soon as the repetition frequency is changed.

Since the demodulated output consists of a large number of separated narrow band spectra, a PLL can selectively lock to the spectrum centered at $f_d$ and, unlike a zero crosser, gives out a frequency averaged over only the bandwidth either of this spectrum or of the PLL, whichever is smaller, whereas a zero crossing detector would give out a frequency averaged over the entire bandwidth of the demodulated spectrum.

To optimize the signal to noise ratio (S/N), the bandwidth of the PLL is made equal to the width of the true Doppler spectrum. On the other hand, with high S/N, the PLL bandwidth can be narrowed to produce better resolution.

Phase-Locked Loop with Double Low-Pass Filter

Normally when the PLL bandwidth is narrowed, the loop's capture range will unavoidably be diminished, making the signal lock acquisition more difficult. However, a scheme was devised to enhance the S/N and the resolution but at the same time retain the large capture range. The idea is to build a PLL with two LPF's 27 and 31: one with wide bandwidth to provide a quick signal capture, the other with small bandwidth to improve S/N and resolution. In searching for $f_d$, the large bandwidth LPF is switched by switch 33 into the loop. As soon as the loop is locked, the d-c voltage switching signal is produced which connects the loop to the small bandwidth LPF. If the lock is lost, the switching signal will change state and switch the loop back to the wide band LPF to resume the large capture range.

Automatic Searching of $f_d$

To search for $f_d$ the VCO of the PLL is scanned automatically. The procedure consists of injecting a ramp voltage from a ramp voltage generator 35 into the VCO input via a Sample and Hold (S&H) 37. As soon as the VCO has enough input voltage to drive its output frequency to be close to the Doppler signal frequency, $f_d$, within the loop's capture range, the loop will lock to $f_d$ and a switching signal, derived from the locking condition (the d-c voltage mentioned above), will trigger the S&H to hold the last value of the ramp voltage. Therefore, the lock is maintained and not effected by the continual variation of the ramp voltage. If the lock is somehow lost, the switching signal will change the S&H from the hold mode to the track mode and the ramp voltage is back in the process of searching for $f_d$.

Automatic Tracking of $f_d$

In applications to systems where velocities vary with time, such as blood flow under cardiac action, the PLL should prove to be vary convenient. Once the loop locks to $f_d$, it will track $f_d$, hence the changing velocity, as long as the $f_d$ variation is within the tracking range of the loop. In this way the cardiac flow profile, for example, can be mapped out with respect to time.

As can be appreciated from the foregoing, this invention provides a Doppler flow measurement system, particularly adapted for the measurement of blood flow deep within a human subject. Obvious modifications of the system herein described will be obvious to those skilled in the art and are included in the scope of the appended claims.

What is claimed is:

1. A pulsed Doppler system for measurement of flow rates at deep internal points in a mass comprising:
   pulsed Doppler output means to transmit a pulsed output signal to a target mass;
   output control means adapted to vary the repetition rate of the pulsed output signal;
   demodulating means to receive said pulsed output signal back when reflected from said target mass and providing a demodulated output signal; and
   return signal analyzer means connected with said demodulating means to receive said demodulated output signal therefrom and discriminating between a false spectrum having a center frequency that is abruptly shifted because of the varied repetition rate of the Doppler output, and a true spectrum of the measured flow rate which has a center frequency that is uniformly identifiable as a measurement of the true change in flow rate of said target mass.

2. The system according to claim 1 in which said return signal analyzer means includes a phase locked loop with said phase locked loop having:
   a voltage controlled oscillator providing an output signal;
   a phase sensitive detector for receiving said output signal from said demodulating means and said output signal from said voltage controlled oscillator, said detector providing a resulting signal indicative of frequency differences between said signals coupled to said detector; and low pass filter means connectable to said phase sensitive detector and said voltage controlled oscillator, said low pass filter means preventing resulting signal passage to said voltage controlled oscillator except when the frequency of the ouput signal from said demodulating means is sufficiently close to the frequency of the output signal from said voltage controlled oscillator so as to be within the capture range of the phase locked loop.

3. The system according to claim 2 in which said phase sensitive detector and said voltage controlled oscillator provide d-c output signals, wherein said phase locked loop includes switching means controlled by said d-c output signals, and wherein said low pass filter means includes two low pass filters selectively connectable to said phase sensitive detector through said switching means with one of said low pass filters having a wide bandwidth which is switched into said phase locked loop for quick signal capture, and with the other of said low pass filters having a narrow bandwidth which is switched into said phase locked loop when the loop is locked whereby the signal/noise ratio is improved and signal resolution is enhanced.

4. A pulsed Doppler flow rate measurement device comprising:

a pulsed Doppler velocimeter for generating ultrasound beam pulses and providing, upon receipt of said pulses from a target, a demodulated output spectrum centered at $nf_r \pm f_{dn\pm} \approx nf_r \pm f_d$ where $f_r$ is the repetition frequency, $f_d$ is the Doppler frequency, and n is equal to an integer other than 0, said velocimeter including means for varying the repetition rate of said ultrasound beam pulse at at least two different rates, $f_r$ and $f_r'$; and decoding means to receive said demodulated output spectrum from said velocimeter and responsive thereto discriminating between the $nf_r \pm f_f$, $nf_r' \pm f_d$ and $f_d$ spectra since the $f_d$ spectrum remains centered to indicate a true character and the $nf_r \pm f_d$ and $nf_r' \pm f_d$ spectra indicate a false character by an abrupt shift of said spectra whereby the true spectrum of the measured flow rate is identified.

* * * * *